United States Patent
Alazzam

(10) Patent No.: US 10,842,593 B1
(45) Date of Patent: Nov. 24, 2020

(54) SULCULAR GUARD AND METHOD OF USE

(71) Applicant: KING SAUD UNIVERSITY, Riyadh (SA)

(72) Inventor: Njood Fahad Abdullah Alazzam, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/732,105

(22) Filed: Dec. 31, 2019

(51) Int. Cl.
*A61C 5/90* (2017.01)
*A61C 9/00* (2006.01)

(52) U.S. Cl.
CPC .............. *A61C 5/90* (2017.02); *A61C 9/0033* (2013.01)

(58) Field of Classification Search
CPC .... A61C 5/85; A61C 5/88; A61C 5/90; A61C 5/80; A61C 9/0026; A61C 9/0033; A61C 5/83
See application file for complete search history.

(56) References Cited

U.S. PATENT DOCUMENTS

| | | | | |
|---|---|---|---|---|
| 3,541,689 A | * | 11/1970 | Snead ................... | A61C 9/0033 433/40 |
| 3,974,561 A | | 8/1976 | Ridgeway | |
| 4,522,593 A | | 6/1985 | Fischer | |
| 5,540,588 A | * | 7/1996 | Earle ..................... | A61C 9/0033 433/136 |
| 5,899,694 A | * | 5/1999 | Summer .............. | A61C 9/0033 433/136 |
| 6,375,461 B1 | | 4/2002 | Jensen et al. | |
| 10,080,626 B1 | * | 9/2018 | Alsulainnani ........... | A61C 5/85 |
| 2004/0126740 A1 | | 7/2004 | Coopersmith | |
| 2005/0116552 A1 | | 6/2005 | Coopersmith | |
| 2007/0196785 A1 | * | 8/2007 | Matheson ............ | A61C 9/0033 433/136 |
| 2009/0274999 A1 | * | 11/2009 | Coppersmith ....... | A61C 8/0001 433/218 |
| 2010/0304328 A1 | * | 12/2010 | Schweizer ........... | A61C 8/0089 433/141 |
| 2013/0288202 A1 | * | 10/2013 | Hochman .............. | A61C 8/008 433/175 |

(Continued)

FOREIGN PATENT DOCUMENTS

| CN | 108814741 A | 11/2018 |
|---|---|---|
| KR | 20150060359 A | 6/2015 |

(Continued)

*Primary Examiner* — Sean M Michalski
*Assistant Examiner* — Shannel N Wright
(74) *Attorney, Agent, or Firm* — Nath, Goldberg & Meyer; Richard C. Litman

(57) ABSTRACT

A sulcular guard can be placed into the gingival sulculus surrounding a tooth to collect excess cement resulting from a replacement crown cementation procedure. The semi-rigid sulcular guard can have a generally "U" shaped cross-section with a central recess configured for collecting and containing the cement. Prior to cementing a crown on a prepared tooth, the guard may be inserted into the gingival sulculus surrounding the tooth. When the crown is pressed onto the tooth, excess cement, which is forced out from the bottom of the crown, can be collected and contained within the recess. Upon completion of the cementation, the guard, and all cement contained therein, may be removed leaving the gingival sulculus free of cement.

6 Claims, 6 Drawing Sheets

(56) References Cited

U.S. PATENT DOCUMENTS

2016/0030142 A1    2/2016  Haas
2017/0245967 A1    8/2017  Edwards
2019/0231475 A1*   8/2019  Yang ..................... A61K 6/887

FOREIGN PATENT DOCUMENTS

TW         M547958 U       9/2017
WO     WO-2019021337 A1 *  1/2019    ............... A61C 5/85

* cited by examiner

SULCULAR GUARD AND METHOD OF USE

BACKGROUND

1. Field

The present disclosure relates to cement management during the cementation of prosthetic crowns, and in particular, to a guard for capturing excess cement during crown replacement.

2. Description of the Related Art

Replacing a crown of a tooth is a common dental procedure to protect a weak tooth or to repair a broken tooth. The procedure involves removing the natural crown of the tooth to create a post for the replacement crown. The replacement crown is typically filled with cement and pushed onto the post. Excess cement expelled from the receiving cavity of the replacement crown may be forced into the gingival sulculus. If cement remains in the gingival sulculus after completion of the procedure, the patient may experience tissue irritation resulting in necrosis of the tissue and/or tooth loss. Accordingly, the practitioner must manually clean out the gingival sulculus after cementation of the replacement crown. This cleaning is time consuming, typically not sufficiently effective, and often uncomfortable to the patient. Thus, a device and method solving the aforementioned problems is desired.

SUMMARY

The sulcular guard is placed into the gingival sulculus surrounding a tooth during a replacement crown cementation procedure to collect and contain excess cement. The semi-rigid sulcular guard can have a generally "U" shaped cross-section defining a recess for collecting and containing the cement. Prior to cementing a crown on a prepared tooth, the guard may be inserted into the gingival sulculus surrounding the tooth. When the crown is pressed onto the tooth, excess cement, which is forced out from the bottom of the crown, will be collected and contained within the recess of the guard. Upon completion of the cementation, the guard, and all cement contained therein, may be removed leaving the gingival sulculus free of cement.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present subject matter provides a sulcular guard for capturing cement forced into the gingival sulculus during a replacement crown cementation procedure. The sulcular guard can be made from a semi-rigid material. The sulcular guard has a generally "U" shaped outer body with a central recess extending along a length of the body. Prior to cementing a crown on a prepared tooth, the guard may be inserted into the gingival sulculus surrounding the tooth. When the crown is pressed onto the tooth, excess cement, which is forced out from the bottom of the crown, can be collected and contained within the recess of the guard. Upon completion of the cementation, the guard, and all cement contained therein, may be removed, leaving the gingival sulculus free of cement.

Figure 1:
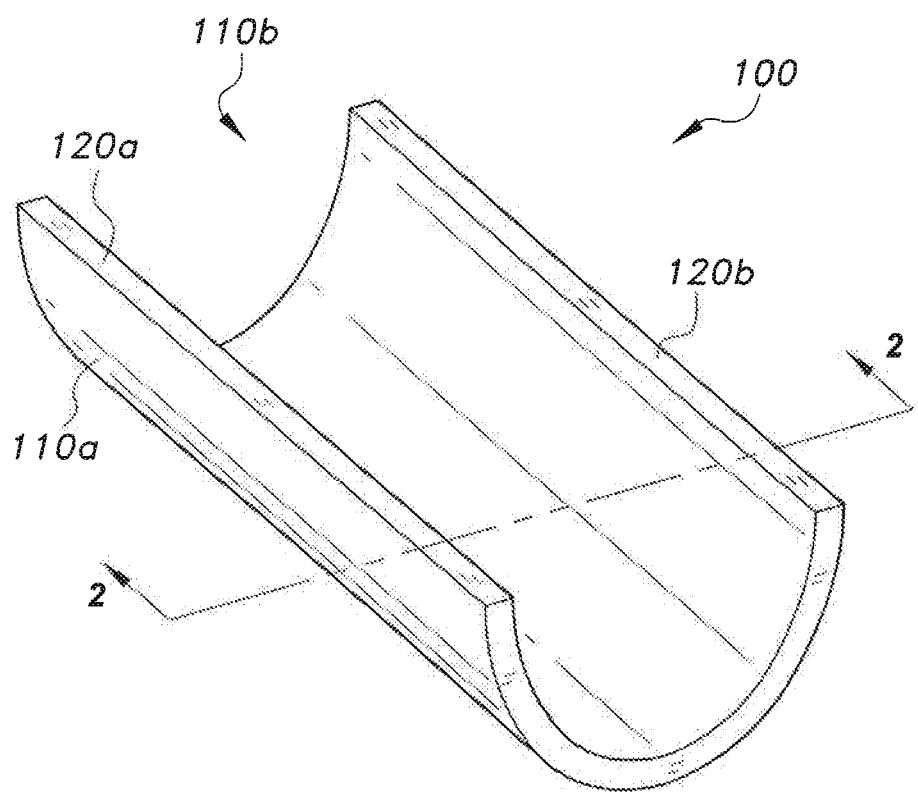
FIG. 1 is a perspective view of a sulcular guard.
Figure 2:
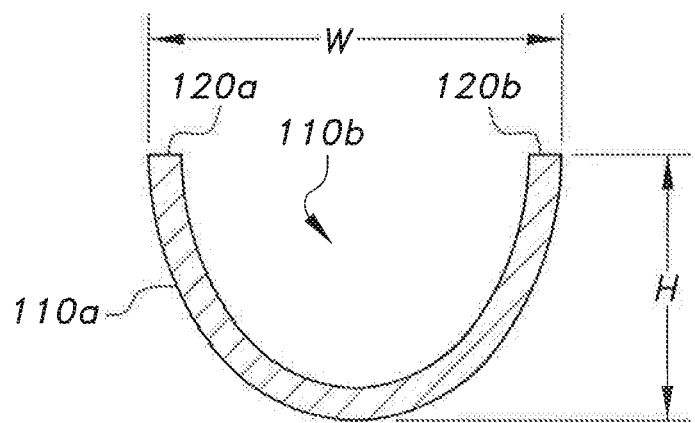
FIG. 2 is a sectioned view of the sulcular guard of FIG. 1 taken along line 2.

FIG. 1 shows an embodiment of the sulcular guard 100. A cross-section of the guard 100 may be generally "U"-shaped or semicircular-shaped, as seen in FIG. 2. The guard 100 includes a generally "U"-shaped body 110*a* defining a central recess 110*b*. Opposing edges 120*a*. 120*b* of the body 110*a* extend parallel to one another and face the same direction. The guard 100 may be semi-rigid to maintain a generally "U" shape or semicircular shape, but have sufficient flexibility to fit into the gingival sulculus.

In some embodiments, the guard 100 may be made of rubber or silicone. When positioned on a horizontal support surface with opposing edges facing upward, A distance H from the upper edges 120 of the strip to the horizontal support surface may be in the range of about 1 mm to about 3 mm and a distance W from one upper edge 120*a* to the opposing upper edge 120*b* may be in the range of about 1 mm to about 2 mm. The aforementioned distances have been found to provide an adequately sized recess 110*b* for collecting all excess cement B and body dimensions for fitting in the gingival sulculus below a lower edge of a replacement crown C. The guard 100 may have a length adequate to encircle a tooth T. A thickness of the guard 100 material may be in the range of about 0.1 mm to about 0.3 mm.

Figure 3:
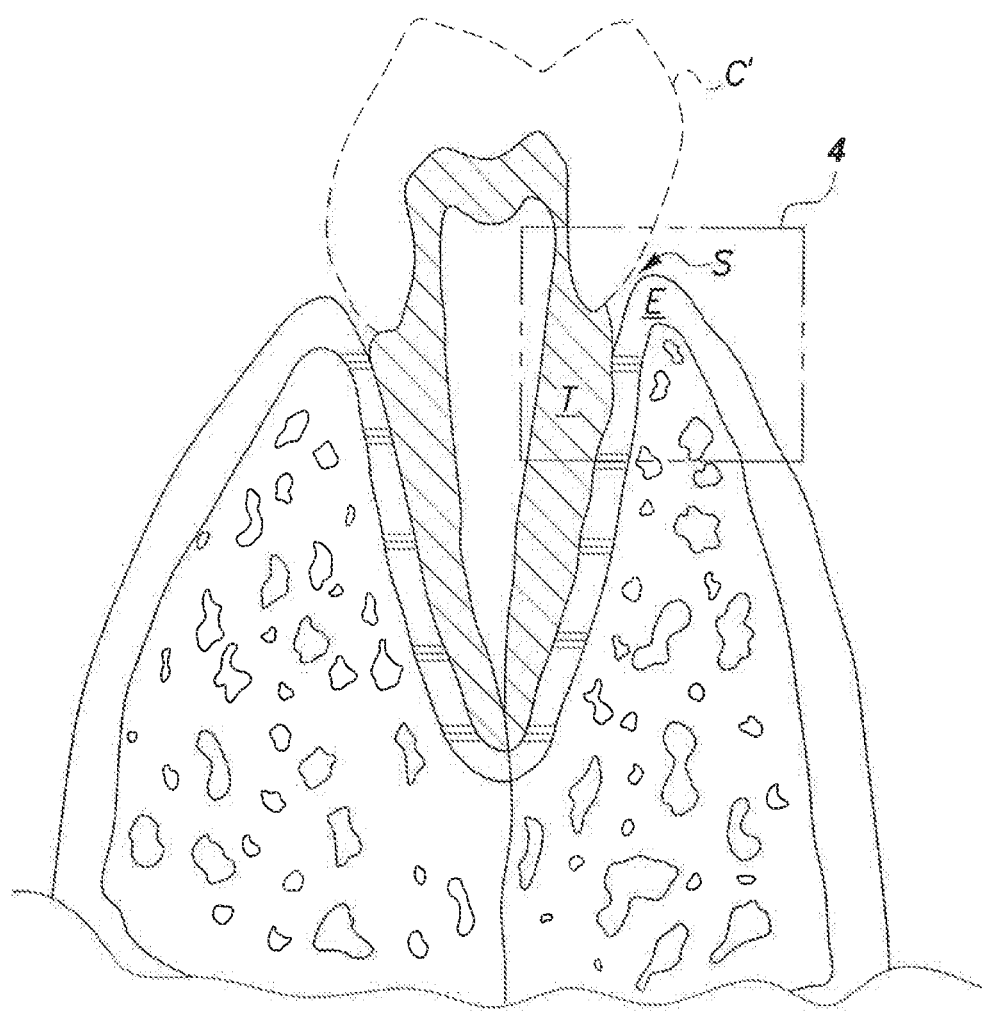
FIG. 3 is an environmental, sectioned view of a tooth prepared for receiving a replacement crown, showing a final position of the replacement crown.
Figure 4:
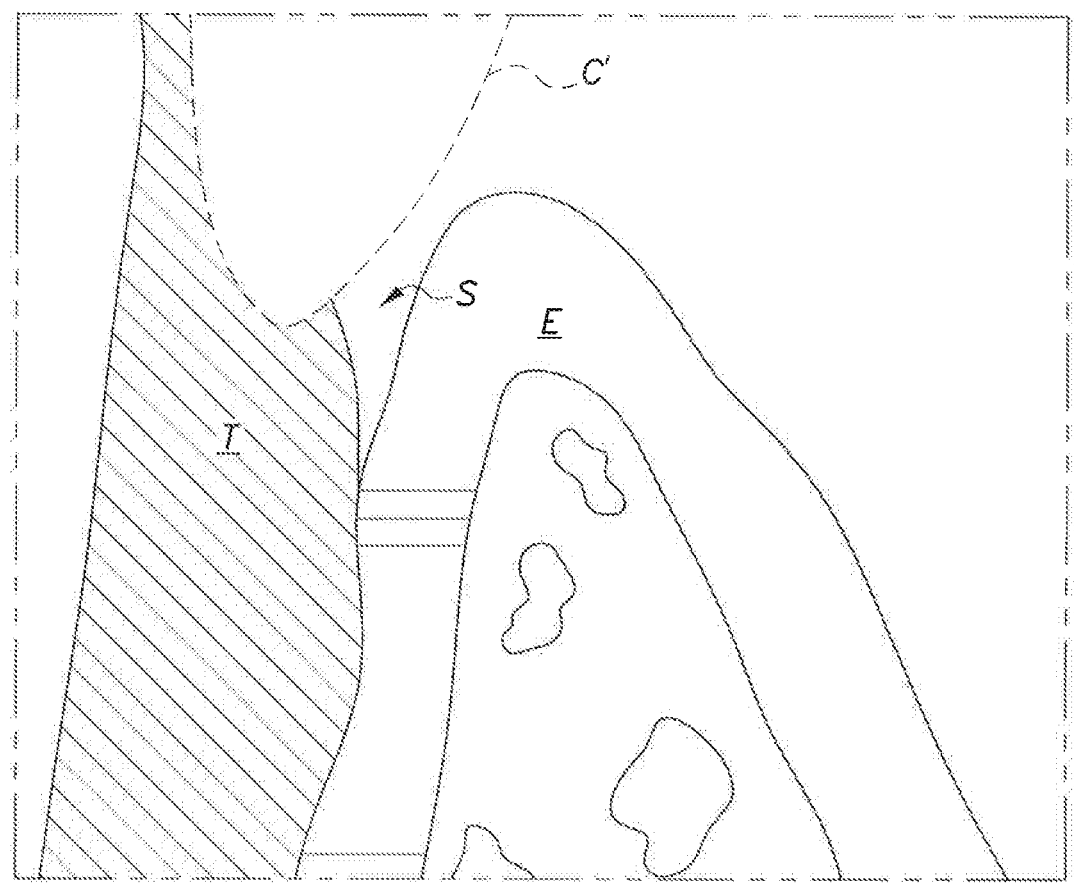
FIG. 4 is a zoomed in, environmental, sectioned view of the tooth prepared for receiving a replacement crown shown in FIG. 3.

FIGS. 3-7 show a method of using the sulcular guard 100 during a crown replacement procedure. FIGS. 3 and 4 show a prepared tooth T with an outline C' showing where the replacement crown C will rest. Tooth preparation may involve removing the damaged crown to provide a post for attaching a replacement crown C. The gingival sulculus S is the pocket between the tooth T and the sulcular epithelium E which extends around a circumference of the tooth T. The gingival sulculus S is typically opened or expanded by gingival retraction when the tooth is being prepared for the crown C, leaving a pocket capable of accepting debris and/or cement.

Figure 5:
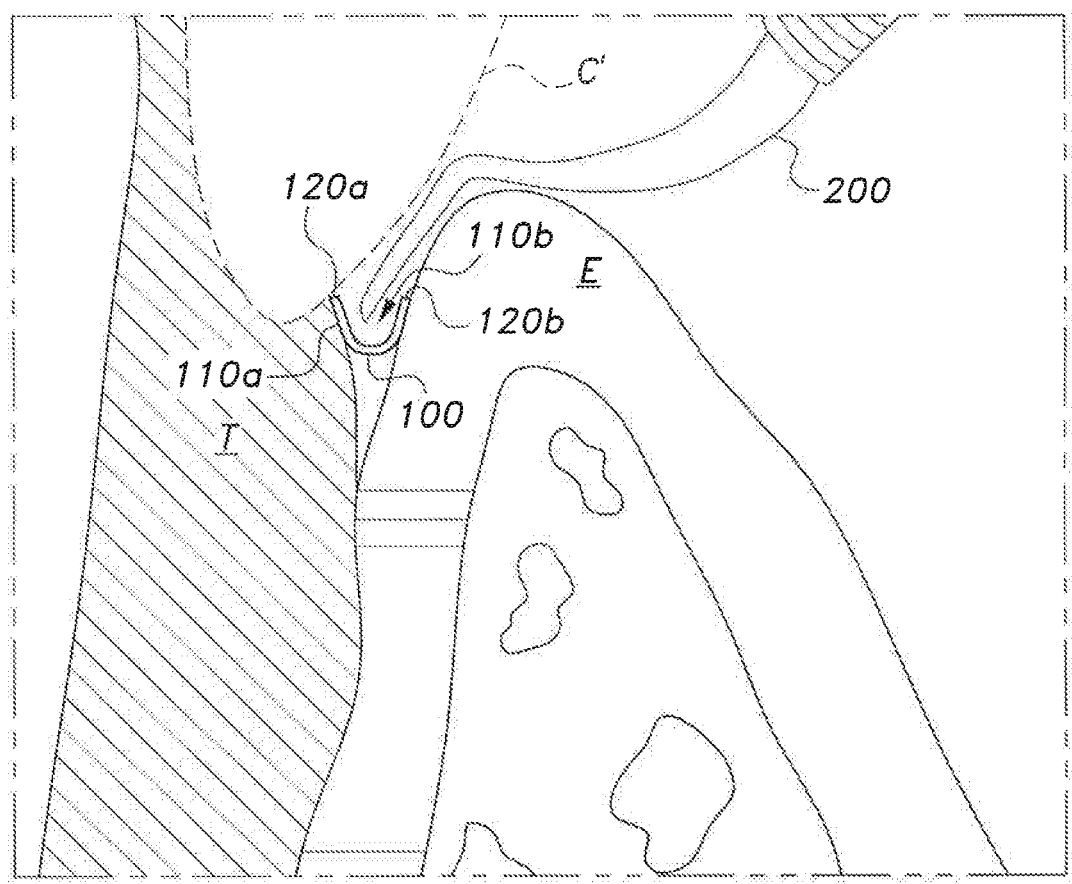
FIG. 5 is a zoomed in, environmental, sectioned view of the tooth prepared for receiving a replacement crown shown in FIG. 3, showing a sulcular guard being initially positioned for cement collection and containment.
Figure 6:
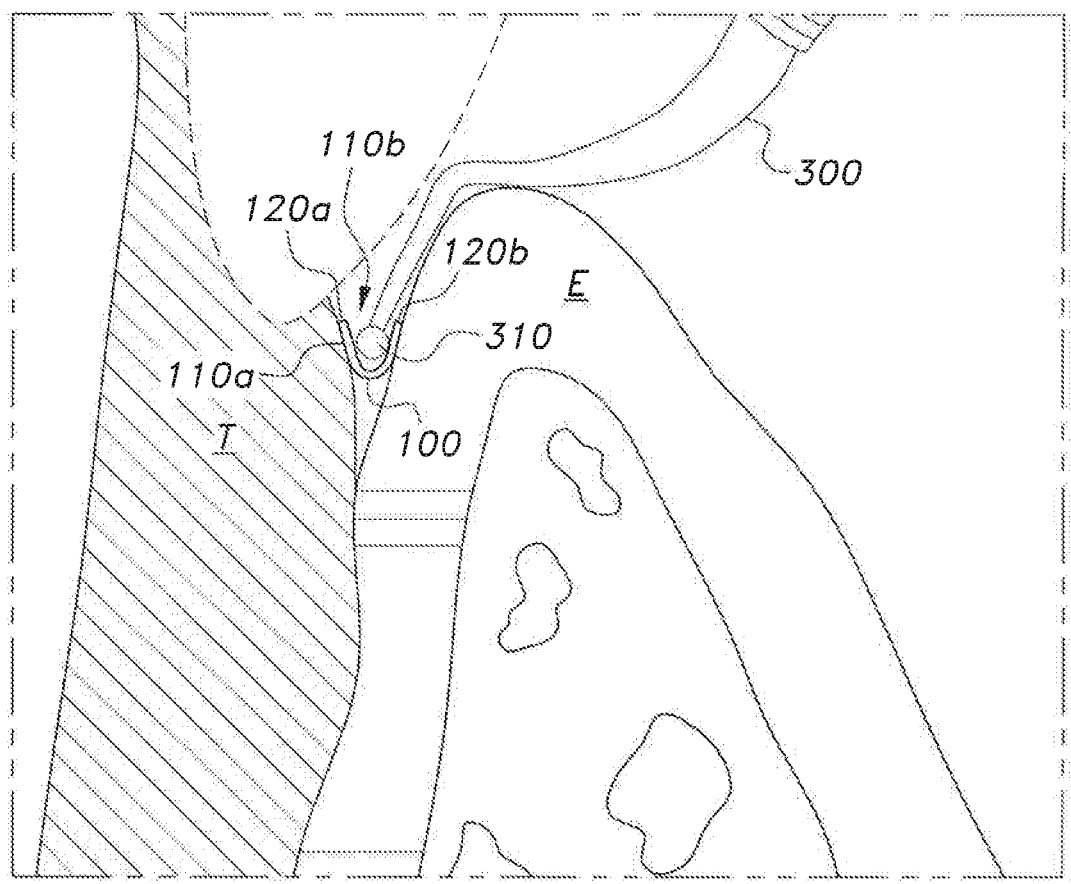
FIG. 6 is a zoomed in, environmental, sectioned view of the tooth prepared for receiving a replacement crown shown in FIG. 3, showing a sulcular guard being ultimately positioned for cement collection and containment.
Figure 7:
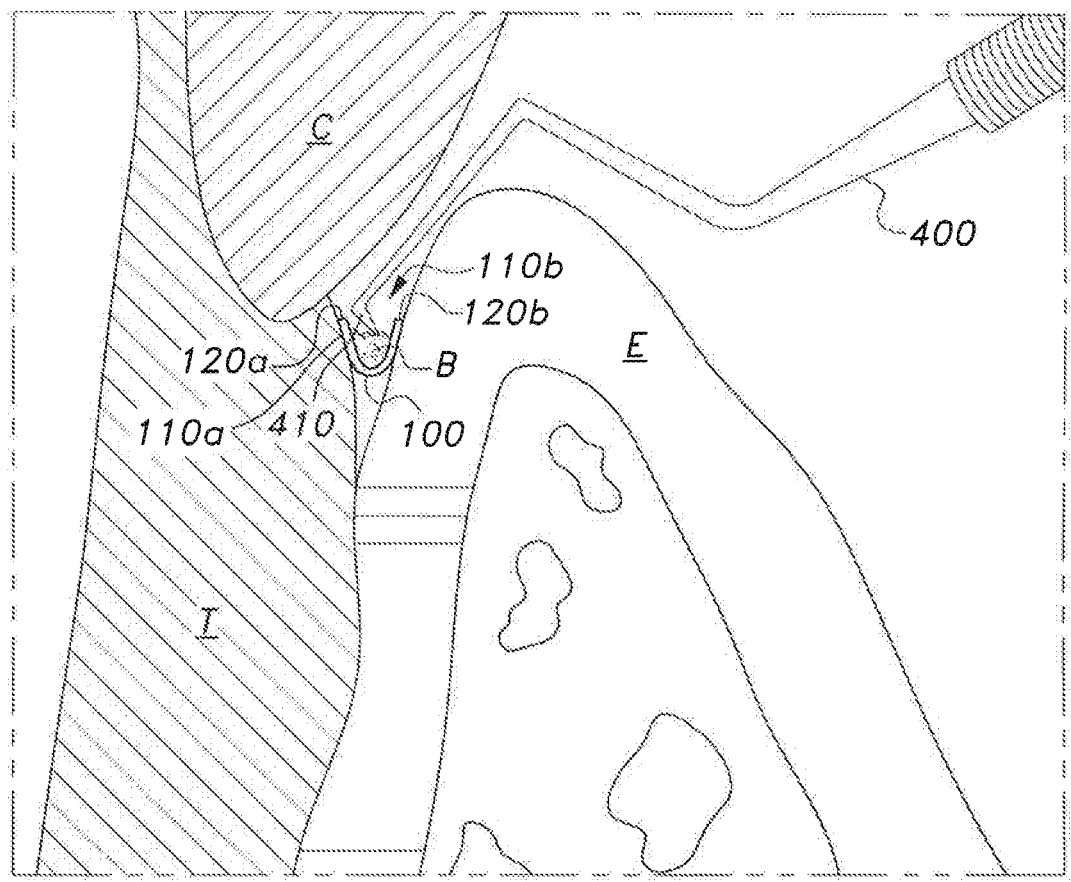
FIG. 7 is a zoomed in, environmental, sectioned view of the tooth of FIG. 3 after cementation of the replacement crown, showing the excess cement contained in the sulcular guard.

Prior to cementing the replacement crown C to the prepared tooth T, the sulcular guard 100 is inserted into the gingival sulculus S around a circumference of the tooth T. Inserting the sulcular guard 100 into the gingival sulculus may be a two-step procedure. FIG. 5 shows the first step which includes wrapping the guard 100 around the tooth T and initially pushing it into the gingival sulcus S. The guard 100 may be initially pushed into the gingival sulcus S using an instrument 200 having an elongated tip sized smaller than a width of the recess 110, such as a dental packing instrument. As seen in FIG. 5, the guard 100 is positioned between the tooth T and the sulcular epithelium 1. Once the guard 100 has been adequately positioned using the packing instrument 200, as shown in FIG. 5, the guard 100 may be seated deeper within the gingival sulcus S using an instrument 300 having a spherical or rounded tip, such as a Dycal application, as shown in FIG. 6.

The replacement crown C may be slightly over filled with cement B to ensure complete coverage of the mating interface between the prepared tooth T and replacement crown C. As a result, when the crown C is pushed into its seated position, excess cement B may be forced out from the lower edge of the crown C around a circumference of the tooth T. The sulcular guard 100, fully seated within the gingival sulcus S, can capture the excess cement B. Once the practitioner is satisfied with the position of the replacement crown C, the guard 100 and the cement B contained therein may be removed using an instrument 400 having a hooked tip, such as a dental explorer.

It is to be understood that the sulcular guard and method of use are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of replacing a crown of a tooth, comprising the steps of:
   preparing the tooth by removing a natural crown of the tooth;
   providing a sulcular guard, the sulcular guard consisting of: a pre-formed U-shaped body having a central recess, the U-shaped body being imperforate, the recess extending along a length of the body, wherein a distance between upper edges of the body defines a width ranging from about 1 mm to about 2 mm and a height of the body ranges from about 1 mm to about 3 mm from the upper edges to the lower surface of the U-shaped body;
   inserting the sulcular guard into a gingival sulcus surrounding the tooth;
   cementing a replacement crown onto the prepared tooth while the sulcular guard is in the surrounding gingival sulcus; and
   collecting excess cement in the sulcular guard.

2. The method of claim 1, wherein the sulcular guard extends around a complete circumference of the tooth.

3. The method of claim 2, wherein inserting the sulcular guard into the gingival sulcus includes steps of:
   positioning the sulcular guard in a first position within the gingival sulcus using a pointed instrument; and
   lowering the positioned sulcular guard in a second position in the gingival sulcus deeper than the first position using an instrument having a rounded tip.

4. The method of claim 2, further comprising a step of removing the sulcular guard from the gingival sulcus.

5. A sulcular guard consisting of:
   a pre-formed U-shaped body having a central recess, the U-shaped body being imperforate, the recess extending along a length of the body, wherein a distance between upper edges of the body defines a width ranging from about 1 mm to about 2 mm and a height of the body ranges from about 1 mm to about 3 mm from the upper edges to the lower surface of the U-shaped body, wherein the sulcular guard is configured to be inserted into a gingival sulcus surrounding the tooth and collect excess cement.

6. The sulcular guard of claim 5, wherein the guard is made from a material selected from the group consisting of rubber and silicone.

* * * * *